United States Patent
Stanzel et al.

(10) Patent No.: US 8,766,141 B2
(45) Date of Patent: Jul. 1, 2014

(54) WELDING SYSTEM HAVING A WIRE-SPECIFIC INTERFACE

(75) Inventors: David A. Stanzel, Appleton, WI (US); Richard M. Hutchison, New London, WI (US); Sundaram Nagarajan, Troy, OH (US); Darryl G. Harvey, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 2397 days.

(21) Appl. No.: 11/490,621

(22) Filed: Jul. 21, 2006

(65) Prior Publication Data

US 2008/0017622 A1  Jan. 24, 2008

(51) Int. Cl.
*B23K 9/10* (2006.01)

(52) U.S. Cl.
USPC ............................ 219/137.2; 219/137 WM (58) Field of Classification Search
USPC ........................... 219/137.2, 137 WM
See application file for complete search history.

(56) References Cited

U.S. PATENT DOCUMENTS

| | | | |
|---|---|---|---|
| 3,127,125 A * | 3/1964 | Jilbert ........................ | 242/422.9 |
| 3,698,652 A * | 10/1972 | Morikawa et al. .......... | 242/474.4 |
| 4,166,591 A * | 9/1979 | Shepherd ..................... | 242/230 |
| 4,525,616 A * | 6/1985 | Slavens ........................ | 219/60 R |
| 4,534,499 A * | 8/1985 | Cox et al. ..................... | 226/184 |
| 4,679,746 A * | 7/1987 | Compagnucci et al. ... | 242/608.8 |
| 4,720,044 A * | 1/1988 | Stemwedel, Jr. ............ | 239/84 |
| 4,885,453 A * | 12/1989 | Martin ......................... | 219/136 |
| 5,213,848 A * | 5/1993 | Zurecki et al. .............. | 427/449 |
| 5,322,236 A * | 6/1994 | Smith .......................... | 242/129.8 |
| 5,509,620 A | 4/1996 | Crews et al. | |
| 5,588,613 A * | 12/1996 | Nagy ........................... | 242/395 |
| 5,725,175 A * | 3/1998 | Thundathil ................. | 242/423.2 |
| 6,064,036 A * | 5/2000 | Kensrue ...................... | 219/137.2 |
| 6,066,833 A * | 5/2000 | Rigdon et al. .............. | 219/137.2 |
| 6,349,895 B1* | 2/2002 | Becherucci et al. ........ | 242/433.3 |
| 6,431,487 B1* | 8/2002 | Wall ............................ | 242/388.2 |
| 7,572,403 B2* | 8/2009 | Gu et al. ...................... | 264/308 |
| 2004/0016736 A1 | 1/2004 | Huismann et al. | |
| 2004/0016737 A1 | 1/2004 | Huismann et al. | |
| 2004/0016788 A1 | 1/2004 | Huismann et al. | |
| 2004/0245230 A1 | 12/2004 | Huismann et al. | |
| 2005/0056629 A1 | 3/2005 | Huismann et al. | |
| 2005/0173392 A1 | 8/2005 | Huismann et al. | |
| 2005/0189335 A1 | 9/2005 | Huismann et al. | |
| 2005/0224482 A1* | 10/2005 | Matiash ...................... | 219/137.2 |

FOREIGN PATENT DOCUMENTS

| | | |
|---|---|---|
| JP | 4049084 | 2/1992 |
| JP | 2003/053541 | 2/2003 |
| JP | 2003/103373 | 4/2003 |
| JP | 2005/052882 | 3/2005 |
| JP | 2006/122991 | 5/2006 |

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A system having a welding wire hub with a wire-specific interface. The wire-specific interface may be configured to enable mounting with a first wire spool and configured to prevent mounting with a second wire spool. In some embodiments, the first and second wire spools have different welding wire types.

21 Claims, 7 Drawing Sheets

WELDING SYSTEM HAVING A WIRE-SPECIFIC INTERFACE

BACKGROUND

The present invention relates generally to welding systems and, in certain embodiments, to welding systems having a wire-specific interface.

Metal inert gas (MIG) welding systems typically consume a welding wire electrode (or "wire" hereinafter) as a workpiece is welded. During welding, a distal end of the wire is brought near the workpiece, and an electric arc is struck between the wire and the workpiece. As the workpiece is welded, the wire is typically melted by the arc, and the liquid metal from the wire solidifies to form a weld. Often, MIG welding systems include a wire feeder to supply wire during welding. Prior to welding, a spool of wire is loaded on the wire feeder, and the wire feeder unwinds wire from the spool during welding. Different types of welding steps employ different types of wire. For example, workpieces consisting of certain materials or welds with certain properties may require different types of wire having different chemistries, diameters, constructions, etc. In some manufacturing operations, different steps within the same manufacturing line may consume different types of wire. Unfortunately, the wire associated with one step may be inadvertently installed in a welding system for a different step, which may result in a workpiece being welded with the wrong type of wire.

BRIEF DESCRIPTION

The following discussion describes, among other things, a system having a welding wire hub with a wire-specific interface. The wire-specific interface may be configured to enable mounting with a first wire spool and configured to prevent mounting with a second wire spool. In some embodiments, the first and second wire spools have different welding wire types.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, some embodiments of the present technique provide a method and apparatus for matching a desired type of wire to a specific welding system. Further, some of these embodiments may substantially block or prevent other, undesired types of wire from being used with the specific welding system. For example, some subsequently discussed embodiments include a wire-specific interface that keys certain types of wire to certain welding systems. That is, in some embodiments, the welding system will accept a certain type of wire and not accept other types of wire, as is explained in greater detail below. Of course, such embodiments are merely exemplary of the present technique and the appended claims should not be viewed as limited to those embodiments. Indeed, the present technique is applicable to a wide variety of systems.

In context of the present application, a wire-specific interface may be defined as a mating interface between a wire hub, spool, wire feeder, and associated components that generally enables or disables use of a particular wire spool based on specific characteristics of that wire. The interface is not merely part of a different product, but rather the wire-specific interface enables generally foolproof control of the use of different wires with various wire feeders, welding units, applications, and so forth.

Figure 1:
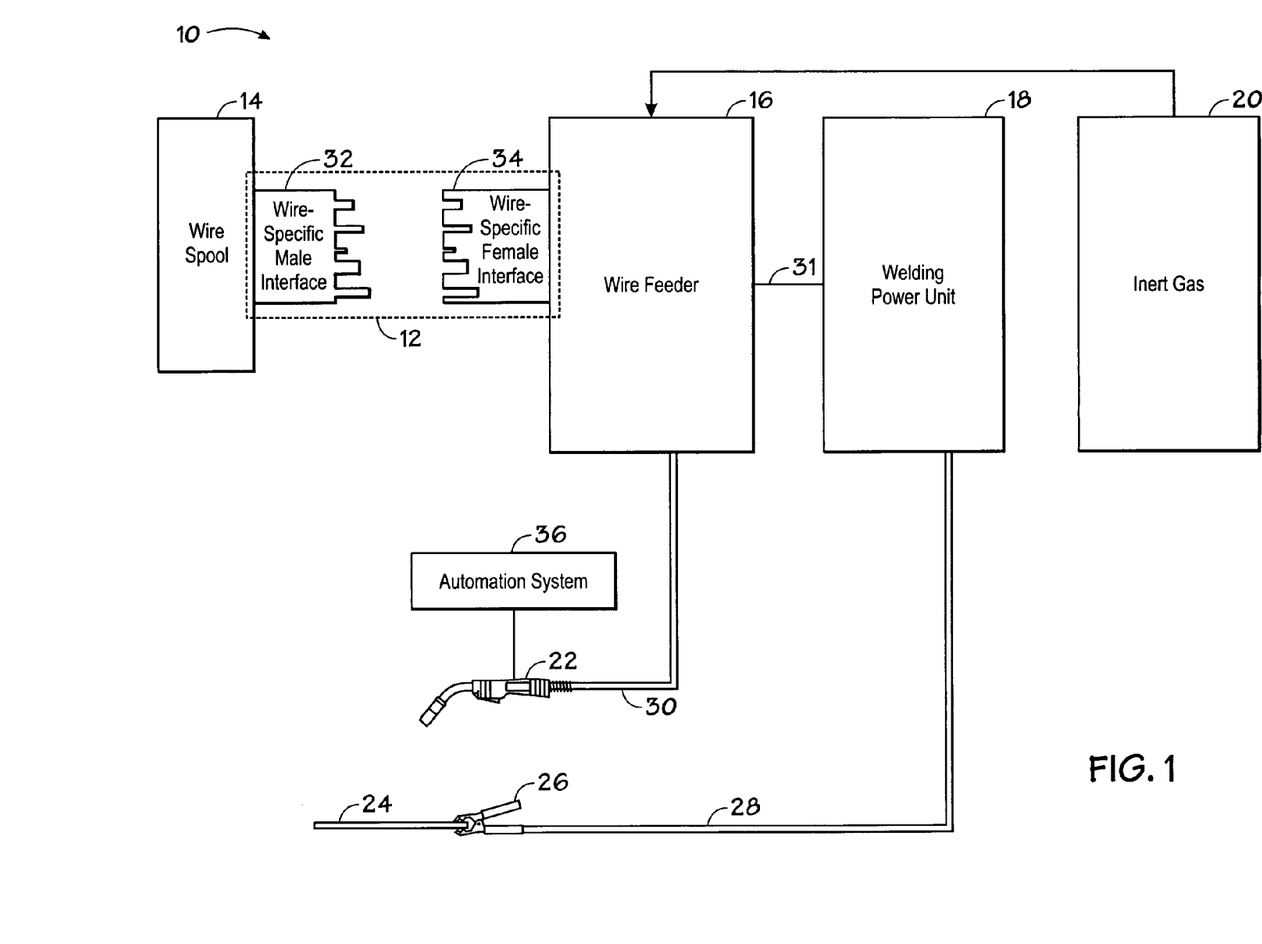
FIG. 1 is a diagrammatical illustration of an exemplary welding system in accordance with an embodiment of the present technique.

FIG. 1 depicts an exemplary welding system 10 having a wire-specific key, indicator, marker, interlock or interface 12. As is explained in greater detail below, the wire-specific interface 12 may reduce the likelihood of the undesired or wrong type of wire being installed in the welding system 10. The present welding system 10 may also include a wire reel or spool 14, a wire feeder 16, a welding power unit 18, an inert gas supply 20, a welding torch 22, a workpiece 24, and a clamp 26. In some embodiments, the illustrated welding system 10 may have a welding cable 30, a ground cable 28, and an automation system 36. The present welding system 10 is a MIG welding system. However, the present technique is applicable to a wide variety of other types of welding systems, such as automatic and semi-automatic variations of flux cored arc welding (FCAW) systems, gas shielded and non-gas shielded welding systems, welding systems using metal and/or organic cores, submerged arc welding (SAW) systems, gas tungsten arc welding (GTAW) systems using hot or cold wire feeding devices, etc. The workpiece 24 may include a car, an aircraft, a locomotive, a watercraft, a pipe or pipeline, a bridge, a building, an engine, automotive components, light and heavy equipment components and assemblies, or combinations thereof, for instance.

The wire-specific interface 12 may include a wire-specific male interface 32 and a wire-specific female interface 34. These interfaces 32 and 34 may feature a variety of systems having complementary, corresponding, interlocked, keyed, or matched interfaces, such as an electrical interface, an optical interface, and/or a mechanical interface, examples of which are described below. As described further below, the interfaces 32 and 34 may involve a variety of features on the wire feeder 12 and wire spool 14, such as features related to driving the wire, features related to mounting the wire, features related to aligning the spool 14, features related to securing the spool, and features related to signaling other portions of the welding system 10, for example. The interfaces 32 and 34 may correspond to a desired or specific type or types of wire in some embodiments, so that each interface 32 and 34 is indicative or representative of a type or types of wire. As used herein, the term "type" broadly refers to a category of wire, which may be distinguished by a variety of parameters, such as composition, chemistry, diameter, cross-sectional shape, crystallography, morphology, size, strength, ductility, toughness, application, inclusion of flux, type of flux, shape, length, or a combination thereof, for example. The wire specific interface 12 may be part of a family of wire-specific interfaces configured to interface a family of welding wire spools mutually exclusively with a family of welding wire hubs, or feeders, or power units, or a combination thereof.

As assembled, the illustrated wire spool 14 couples to the wire-specific male interface 32 and the present wire feeder 16 couples to the wire-specific female interface 34. Of course, in other embodiments, the position of the wire-specific male interface 32 and the wire-specific female interface 34 may be reversed, with the wire-specific male interface 32 coupled to the wire feeder 16 and the wire-specific female interface 34 coupled to the wire spool 14. Further, the interfaces 32 and 34 may be integrally formed as part of the wire spool 14 and the wire feeder 16, respectively, or vise-versa. In some embodiments, the interfaces 32 and 34 are disposed so that un-matched interfaces 32 and 34 obstruct, prevent, or indicate installation of a wire spool 14 having an undesired type of wire. When the wire spool 14 is loaded on the wire feeder 16, or an operator attempts to load the wire spool 14 on the wire feeder 16, the wire-specific male interface 32 interfaces or fails to interface with the wire-specific female interface 34. That is, the interfaces 32 and 34 engage or fail to engage one another and indicate a match or a lack of a match. For example, in systems employing mechanical interfaces 32 and 34, the interfaces 32 and 34 may obstruct the installation of the wire spool 14 on the wire feeder 16, as is described in greater detail below.

In the present embodiment, the wire feeder 16 couples to the welding power unit 18 through a wire feed 31, and the inert gas supply 20 couples to the welding power unit 18 via a gas line 33. These components 14, 12, 16, 18 and 20 may be stand-alone units, or, in other embodiments, components 14, 12, 16, 18 and 20 may be partially or entirely integrated into a single unit. The welding power unit 18 may couple to the welding torch 22 through the welding cable 30, and the illustrated workpiece 24 couples to the welding power unit 18 through the clamp 26, which may be connected to the ground cable 28. An automation system 36 may link with the torch 22. However, in some embodiments, the welding system 10 may be non-automated.

In operation, the wire-specific interface 12 may permit certain types of wire spools 14 to connect to the wire feeder 16 and prevent other types of wire spools 14 from connecting to the wire feeder 16. In the present embodiment, the wire-specific female interface 34 and the wire-specific male interfaces 32 are associated with the desired type of wire spool 14, and undesired types of wire spools 14 are associated with different wire-specific interfaces 32 and 34. Wire spools 14 having a kind of wire-specific male interface 32 associated with the undesired types of wire spools 14 may be blocked or prevented from coupling to the wire feeder 16 by the wire-specific female interface 16.

During welding, the wire feeder 16 may feed wire to the welding power unit 18, and the inert gas supply 20 may output gas to the welding power unit 18. The welding power unit 18 may conduct and/or control a welding current, a wire feed, and a gas flow through the welding cable 30 to the torch 22. The current may flow through the wire at the end of the torch 22 and arc across an air gap to the workpiece 24. The inert gas flow may form a protective gas shield around the arc. As the wire is fed through the torch 22, the arc between the torch 22 and the workpiece 24 may melt the wire and the workpiece 24, thereby forming a liquid pool of metal on the workpiece 24. This liquid pool of metal may freeze and weld the workpiece 24.

Figure 2:
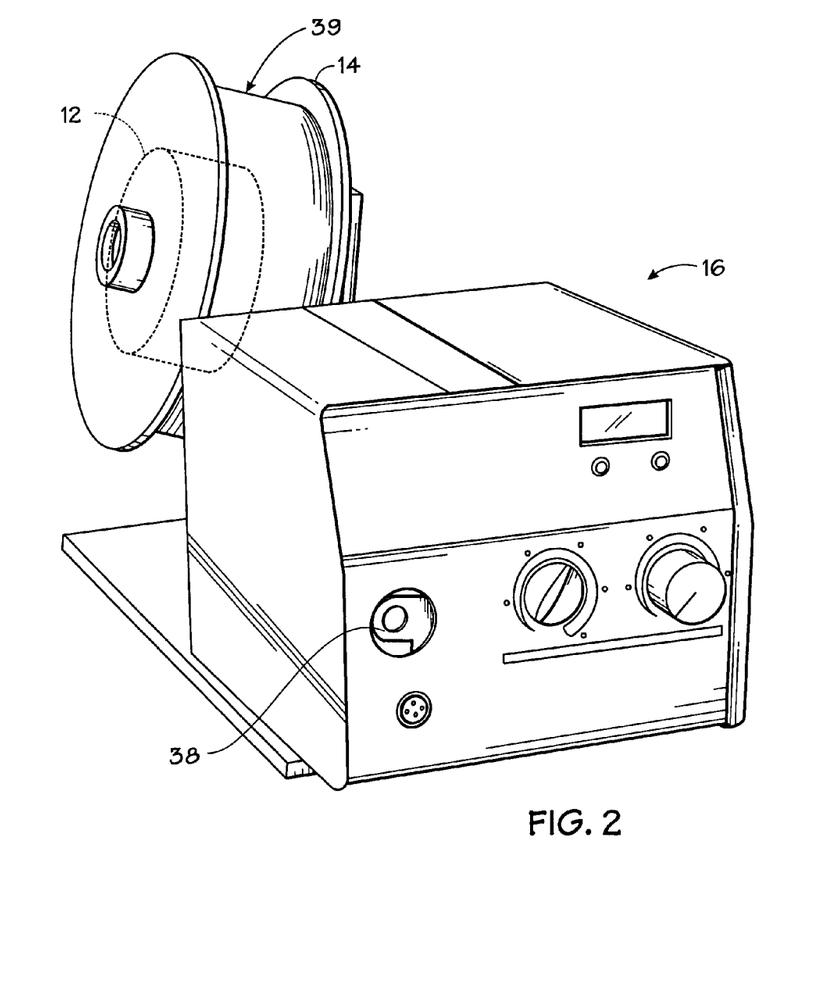
FIG. 2 is a perspective view of an exemplary wire feeder in accordance with an embodiment of the present technique.

FIG. 2 illustrates an exemplary stand-alone wire feeder 16. In addition to the previously discussed wire-specific interface 12 and the wire spool 14, the wire feeder 16 may include a wire outlet 38 and wire 39. A wire drive and wire drive controller in the wire feeder 16 may unwind wire 39 from the wire spool 14 and drive the wire 39 out through the wire outlet 38. The illustrated wire 39 may be a solid wire, a cored or composite steel wire, an aluminum wire, a stainless steel wire, a nickel alloy wire, a hard surfing wire, or a submerged arc wire, for example. In other embodiments, the wire feeder 16 may be integrated into the welding power unit 18.

Figure 3:
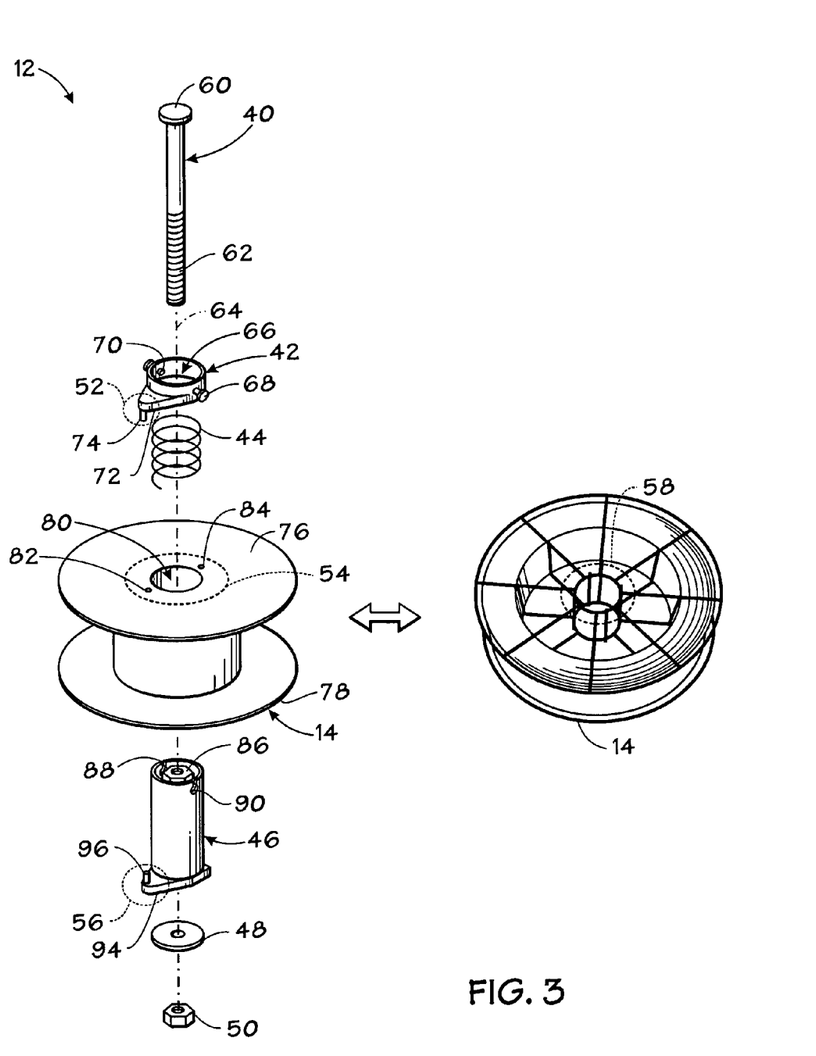
FIG. 3 is an exploded view of an exemplary wire-specific interface system in accordance with an embodiment of the present technique.

FIG. 3 illustrates an exemplary wire-specific interface 12 having an axle 40, a retaining ring 42, a spring 44, a hub 46, a washer 48, and a nut 50. FIG. 3 also illustrates a number of exemplary regions 52, 54, 56, and 58 where a wire-specific male interface 32 or a wire-specific female interface 34 may be located, as is discussed further in reference to FIGS. 4-8. In the illustrated embodiment of FIG. 3, these wire specific interfaces may include pins 74 and/or 96 and alignment apertures 82 and/or 84 as discussed below. The illustrated axle 40 may include a head 60 and a threaded end portion 62. The axle 40 may rotate about axis of rotation 64 and may be made of a variety of materials, such as steel, plastic, or other appropriate materials.

Figure 10:
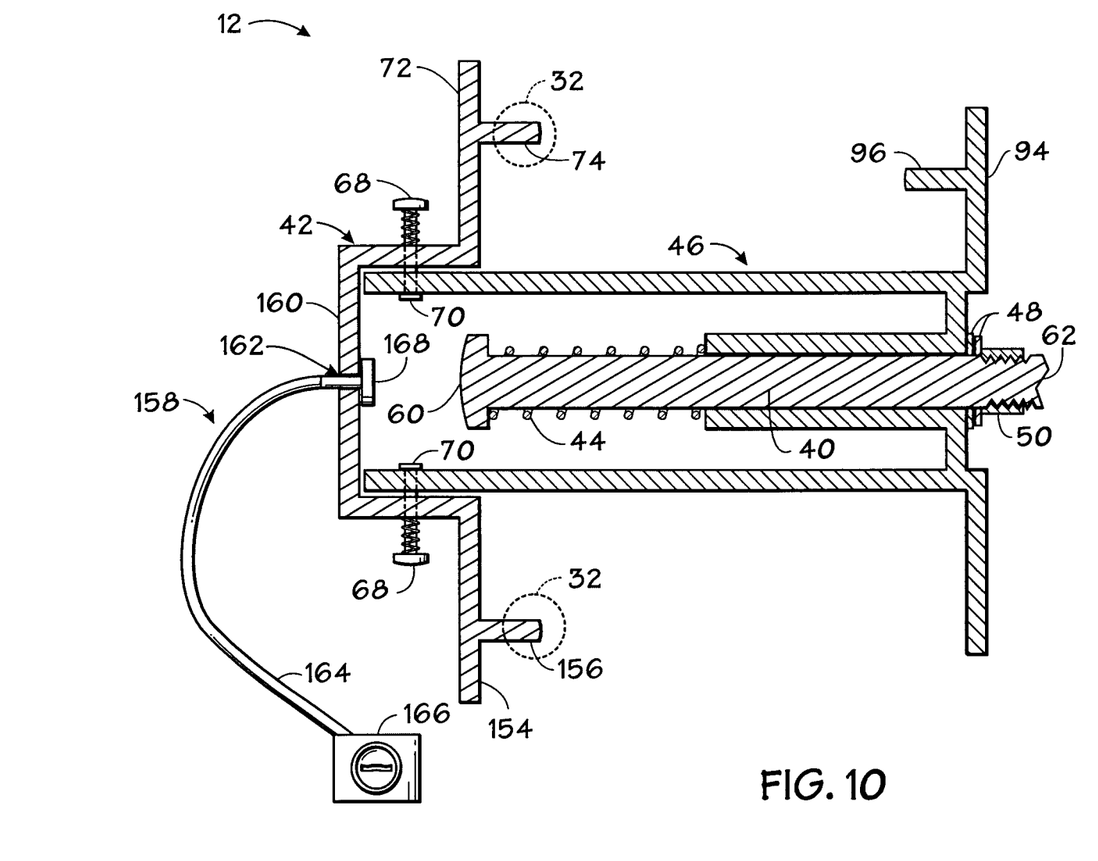
FIG. 10 is a cross-sectional view of another exemplary wire-specific interface system in accordance with an embodiment of the present technique.

The present retaining ring 42 may feature a central aperture 66, resiliently sliding pins 68, locking tabs 70, an interface support member 72, and a pin 74. In the current embodiment, the retaining ring 42 is made of molded plastic, with the exception of the resiliently sliding pin 68 and the locking tabs 70, which may be made of steel or other appropriate materials. The illustrated resiliently sliding pins 68 and locking tabs 70 may include a compression spring that drives the resiliently sliding pins 68 outward and away from each other, as is illustrated by FIG. 10. In some embodiments, the central aperture 66 may be covered with a top plate and/or the interface support member 72 may be omitted, which is not to suggest that any other feature discussed herein may not also be omitted.

The illustrated spool 14 may include a far side outer face 76, a near side outer face 78, a hub receptacle 80, and alignment apertures 82 and 84. The hub 14 may be made of a variety of materials, such as wood, cellulosic materials, composite materials, metal, or plastics, for example. In some embodiments, a spool 14' having a framework constructed from metal rod may be used in place of the spool 14. For example, the spool 14' may have a plurality of spokes leading from an inner hub framework to an outer cylindrical framework.

Figure 9:
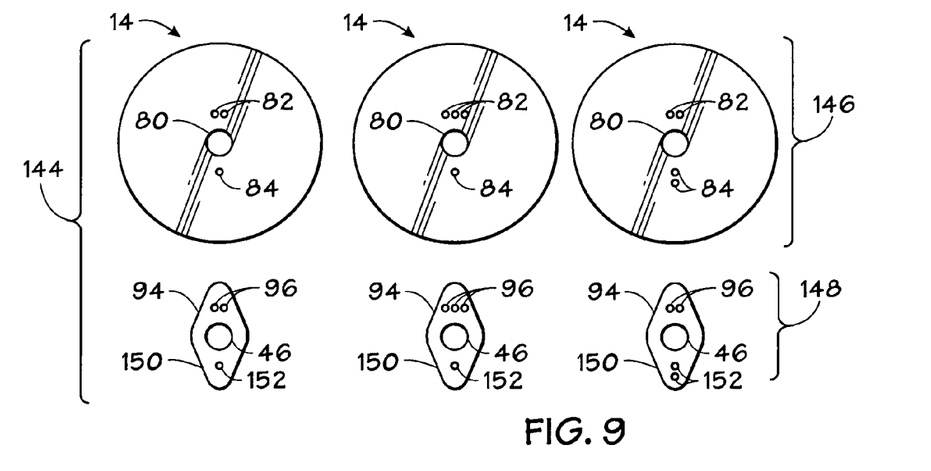

The hub 46 may include an axle receptacle 86, a spring receptacle 88, locking slots 90, interface support member 94, and one or more pins 96. The hub 46 may be constructed from injected molded plastic, metal, or other appropriate materials, for example. The axle receptacle 86 and spring receptacle 88 may be concentrically disposed within the hub 46, with the axle receptacle 86 concentrically disposed within the spring receptacle 88. In some embodiments, the interface support member 94 may extend from more than one side of the hub 46. For example, two or more interface support members 94 may be rotationally symmetrically disposed about the axle receptacle 86, as illustrated by FIG. 9.

When assembled, the axle 40 may extend through the axle receptacle 86 of the hub 46. In some embodiments, a distal part of the threaded end portion 62 of the axle 40 may protrude from the hub 46. A support member on the wire feeder 16 may couple to the threaded end portion 62 of the axle 40, thereby rotatably supporting the hub 46 in some embodiments. The washer 48 and nut 50 may be positioned on the threaded end potion 62 so as to secure the head against the top portion of the hub 46 and the hub 46 to the support member of the wire feeder 16. The spring 44 may be disposed within the spring receptacle 88, thereby tending to resiliently bias the hub 46 against a support member on the wire feeder 16.

In the present embodiment, the spool 14 may be secured to the hub 46 by inserting the hub 46 through the hub receptacle 80 and attaching the retaining ring 42 to the hub 46. As the spool 14 is positioned on the hub 46, pin 96 may insert into an alignment aperture 82 on the near side outer surface 78 of the spool 14. Similarly, as the retaining ring 42 is positioned on the hub 46, pin 74 may engage with an alignment aperture 82 or 84 on the far side outer surface 76. To secure the retaining ring 42, the resiliently sliding pins 68 may be compressed towards each other, i.e., inwardly, as the retaining ring 42 is slid over the hub 46. In the current embodiment, as the resiliently sliding pins 68 are compressed inwardly, locking tabs 70 may also move inward, thereby permitting the locking tabs 70 to slide through locking slots 90. Once the retaining ring 42 is in position on the hub 46, the resiliently sliding pins 68 may be released and locking tabs 70 may interlock with locking slots 90, thereby securing the illustrated retaining ring 42 to the hub 46 and the spool 14 to the hub 46.

Before, while, or soon after the spool 14 is applied to the hub 46, or the retaining ring 42 is applied to the hub 46, a female wire-specific interface 34 and male wire-specific 32 may indicate if the spool 14 has the appropriate type of wire for the hub 46, as is described in further detail below. Again, these interfaces 32 and 43 may be located in a variety of regions, such as exemplary regions 52, 54, 56, and 58. In the illustrated embodiment of FIG. 3, these wire specific interfaces may include pins 74 and/or 96 and alignment apertures 82 and/or 84 as discussed below. As is described in more detail in references to FIGS. 4-8, wire-specific male interfaces 32 and wire-specific female interfaces 34 may generally block or prevent the installation of a spool 14 having an undesired type of wire 39 on the hub 46 and permit the installation of a spool 14 having a desired type of wire 39.

Figure 4:
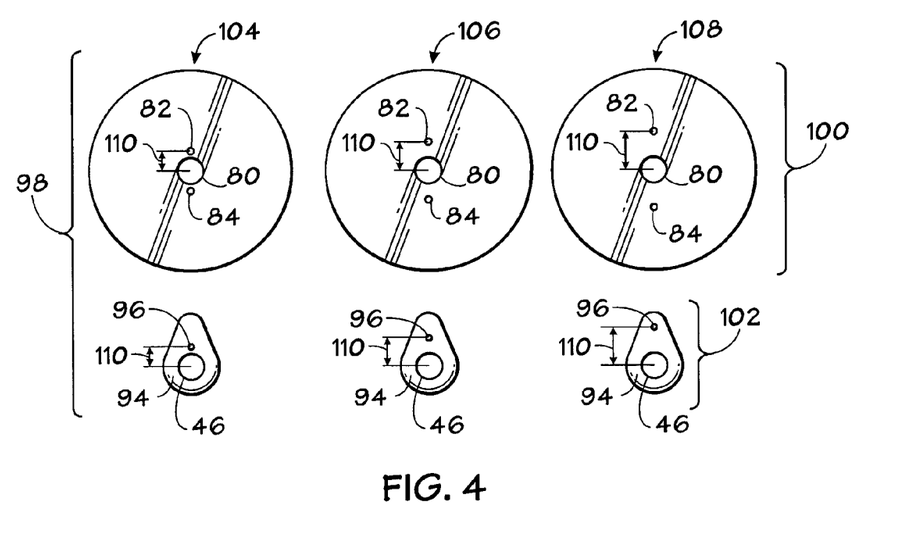
FIGS. 4-9 are diagrammatic representations of exemplary wire-specific interface systems in accordance with various embodiments of the present technique.

FIG. 4 illustrates an exemplary product line, system, or family of wire-specific interfaces 98. Each pair of members of the present family corresponds to a different type of wire 39. The present family 98 includes a group of wire-specific female interfaces 100 and a group of wire-specific male interface 102, where each member of the female group 100 is keyed to a corresponding member of the male group 102. In the present embodiment, the female group 100 includes spools 104, 106, and 108 having different types of wire 39. Each of the spools 104, 106 and 108 of the current female group 100 includes alignment apertures 82 and 84 at a different radius or distance 110 from the hub receptacle 80. Similarly, the male group 102 includes pins 96 at generally the same distance 110 from the center of the corresponding hub 46.

In operation, the family 98 may increase the likelihood that the correct type of wire 39 will be installed on a given hub 46. To match the hubs 46 to one of the spools 104, 106, or 108, the pins 96 align with the alignment apertures 82 or 84 on a spool 104, 106, or 108 having the desired, or appropriate type of wire 39 and misalign with the alignment apertures 82 and 84 on spools 104, 106, or 108 having the undesired, or wrong type of wire 39. In other words, selecting a hub 46 from the male group 102 may limit the types of wire 39 that can be placed on the hub 46.

In other embodiments, the retaining ring 42 may be configured in a manner similar to the male group 102, as indicated by region 52 of FIG. 3. That is, the pin 74 on the interface support member 72 may be spaced at the distance 110 away from the center of the retaining ring 42 so that the retaining ring 42 matches with a given spool 104, 106, or 108. In the present embodiment, the alignment apertures 82 and 84 are symmetric about the hub receptacle 80, thereby permitting the spool 14 to be placed so that it unwinds in a clockwise or counter-clockwise manner.

Figure 5:
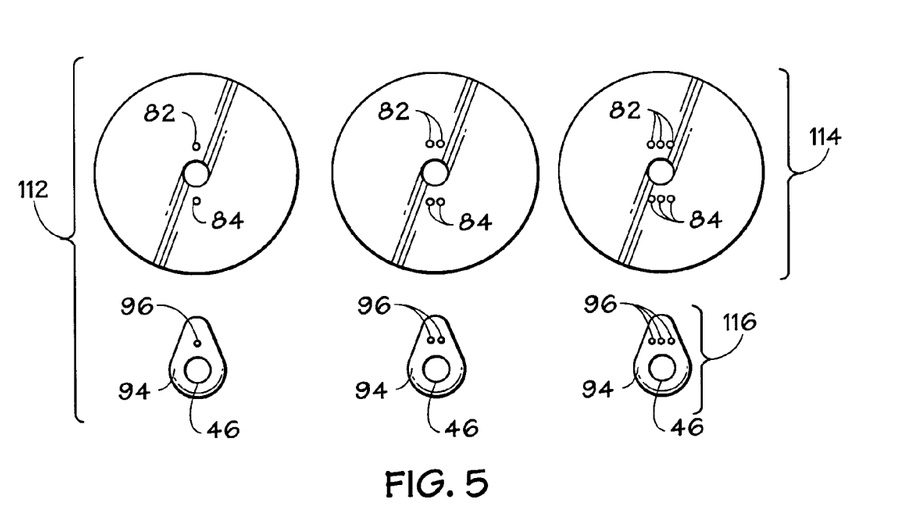

FIGS. 5-9 illustrate other exemplary wire-specific interface families. For example, FIG. 5 depicts another family of wire-specific interfaces 112 having a female group 114 and a male group 116. In this embodiment, the wire-specific interfaces 112 are differentiated by the number of alignment apertures 82 and 84 and a corresponding number of pins 96. For example, the male and female wire specific interfaces, e.g., 82, 84, and 96, may include one, two, three, four, five, six, seven, eight, nine, ten, or more mating apertures and pins in symmetrical or non-symmetrical arrangements. As with the preceding embodiment, the present pattern and number of pins 96 may be employed on a retaining ring 42, for instance in region 52 on interface support member 72.

Figure 6:
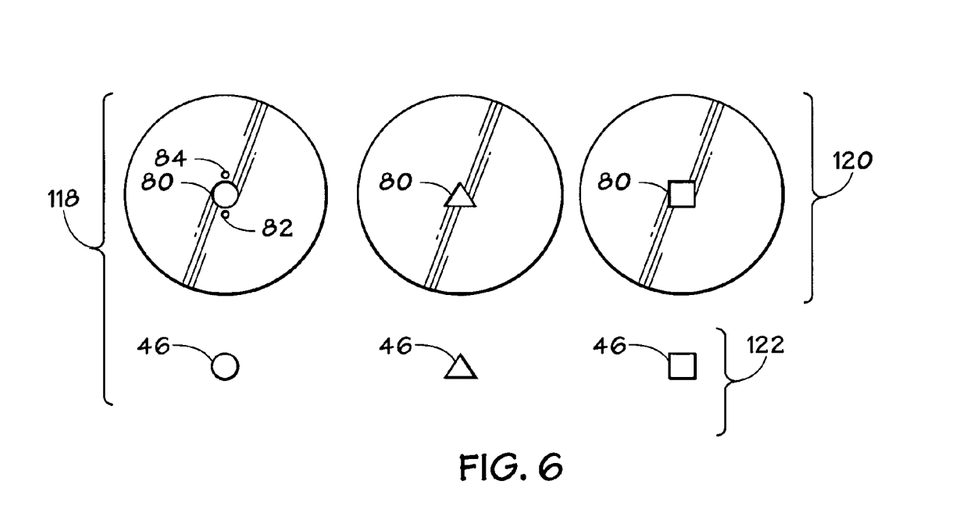

FIG. 6 illustrates a family 118 with a female group 120 and male group 122. In this embodiment, the wire-specific interfaces 112 are differentiated by the shape of the hub 46 and the hub receptacle 80. As with the other embodiments, a wide variety of permutations of the differentiating parameter (i.e., the shape of the hub 46) in this wire-specific interface family 118 are envisioned. For example, the male and female shapes may include a circle, a non-circular shape, a triangle, a square, a rectangle, a trapezoid, a parallelogram, a polygon (e.g., pentagon, octagon, etc.), and so forth.

Figure 7:
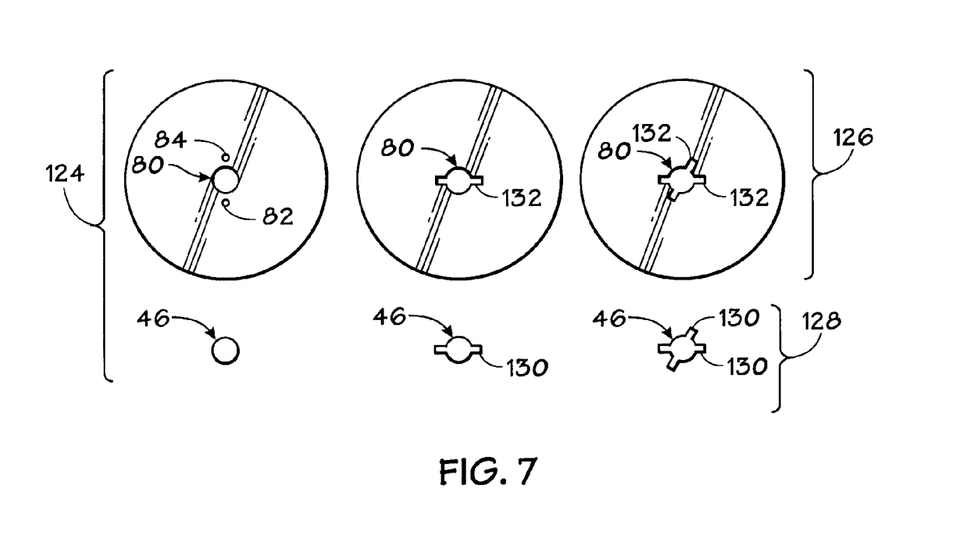

FIG. 7 illustrates a family 124 with a female group 126 and a male group 128. In the family 124, the hubs 46 are keyed to the hub receptacle 80 with a unique number of fins 130 on the hubs 46 and a corresponding number of slots 132 extending from the hub receptacle 80. Again, a wide variety of arrangements of fins 130 and slots 132 may be employed to differentiate a wide variety of types of wire 39. For example, one, two, three, four, five, six, seven, eight, nine, or more fins 130 and corresponding slots 132 may be disposed at a variety of regularly spaced, irregularly spaced, symmetric, or non-symmetric angles about the hub 46 and hub receptacle 80. Further, the fins 130 and slots 132 may radially and/or axially extend a along a generally similar distance, two different distances, three different distances, four different distances, five different distances, six different distances, seven different distances, eight different distances, or more different distances. In some embodiments, the cross-sectional shape of the fins 130 and 132 may vary. For instance, one or more of the fins 130 and slots 132 may have a cross sectional shape that is generally curved or polygonal, such as a simple polygon, a complex polygon, a convex polygon, a concave polygon, a cyclic polygon, an equilateral polygon, and/or a regular polygon. In some embodiments, the cross sectional shape of one or more of the fins 130 and slots 132 may be generally triangular, quadrilateral, hexagonal, heptagonal, octagonal, nonagonal, decagonal, hendecagonal, dodecagonal, tridecagonal, ect., for instance.

Figure 8:
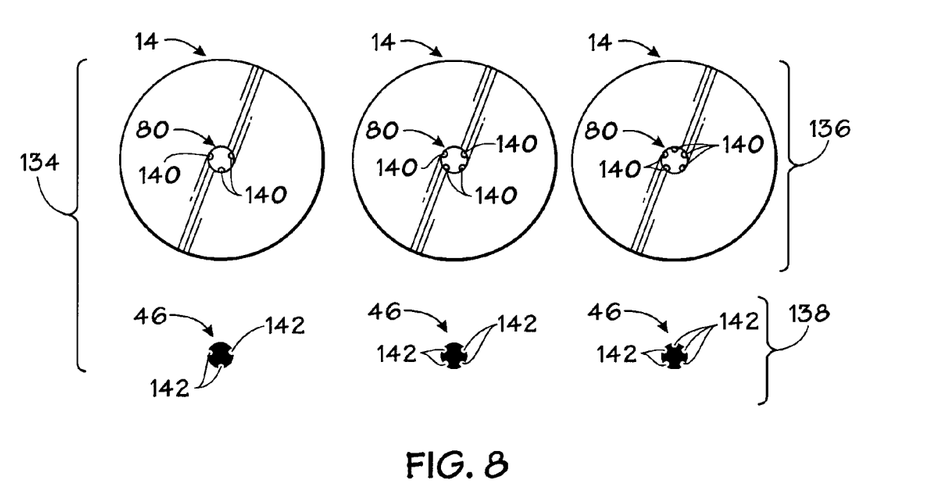

FIG. 8 illustrates another family 134 with a female group 136 and a male group 138. In the present embodiment, the female group 136 includes rods 140 within the hub receptacle 80. The hubs 46 in the exemplary male group 138 include channels or indents 142 adapted to accept and interface with the rods 140. Each exemplary spool 14 and hub 46 has a different and corresponding number of rods 140 or indents 142, respectively. In some embodiments, the rods 140 may correspond to portions of the inner hub framework of the wire spool 14' depicted in FIG. 3.

As a final example, FIG. 9 illustrates a family 144 with a female group 146 and a male group 148. In the family 144 the hubs 46 (or retaining rings 42 in other embodiments, such as the embodiment of FIG. 10) include a secondary interface support member 150 that supports a second pin group 152. The pins 94 and 152 and mating apertures 82 and 84 may be symmetrically or non-symmetrically disposed. The number, radial positioning, angular positioning, length, cross-sectional shape, or other parameters of the pins 94 and 152 and mating apertures 82 an 84 may be varied to differentiate among a variety of types of wire spools 14. That is, in this embodiment, each pin group 152 and 96 and alignment apertures 82 and 84 correspond to different types of wire 39.

FIG. 10 illustrates a cross-section of another exemplary wire-specific interface 12. In the present embodiment, the retaining ring 42 includes another interface support member 154 and a second pin 156. The arrangement, spacing, and/or number of pins 74 and 156 or other features may form a male wire-specific interface 32 on the retaining ring 42. In the present embodiment, the retaining ring 42 includes an interface locking mechanism 158. The illustrated locking mechanism 158 has a top face 160, a rotation aperture 162, and a cable 164 extending between a lock 166 and a tabbed member 168.

In operation, the wire-specific interface 12 may permit certain types of wire 39 on the hub 46 and obstruct the placement of other types of wire 39 on the hub 46. Further, in this embodiment, the interface locking mechanism 158 may secure the retaining ring 42 to a wire feeder 16 associated with the hub 46 without preventing the hub 46 from rotating. The tabbed member 168 and cable 164 may rotate within rotation aperture 162 as the hub rotates 46 and wire 39 is un-wound from the spool 14. Additionally, the cable 164 may permit the retaining ring 42 to be removed from the hub 46 when installing a new spool 14, but prevent the retaining ring 42 from being separated from the wire feeder 16. Advantageously, the illustrated interface locking mechanism 158 may reduce the likelihood of an operator switching retaining rings 42 to install an undesired type of wire 39 on the hub 46.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a welding wire feeder comprising a wire-specific interface configured to enable mounting with a first wire spool and configured to prevent mounting with a second wire spool, where the first and second wire spools comprise different welding wire types, wherein the wire-specific interface comprises a non-circular hub and complementary hub receptacle in the first wire spool, wherein the non-circular hub and the complementary hub receptacle have a generally triangular, quadrilateral, hexagonal, heptagonal, octagonal, nonagonal, decagonal, hendecagonal, dodecagonal, or tridecagonal shape.

2. The system of claim 1, wherein the wire-specific interface is a mechanical interface.

3. The system of claim 1, wherein the wire-specific interface is a member of a family of wire-specific interfaces, each wire-specific interface is different from others in the family of wire-specific interfaces, and each wire-specific interface is indicative of a different welding wire type.

4. The system of claim 1, comprising a family of welding wire hubs, wherein each welding wire hub of the family includes a different wire-specific interface indicative of a different welding wire type.

5. The system of claim 1, wherein the wire-specific interface comprises a retaining ring and an interface locking device.

6. The system of claim 1, wherein the wire-specific interface comprises one or more pins.

7. The system of claim 1, wherein the wire-specific interface is a male wire-specific interface.

8. The system of claim 1, wherein the wire-specific interface is a female wire-specific interface.

9. The system of claim 1, comprising the first spool, wherein the first spool comprises a complementary-wire-specific interface that mates with the wire specific interface.

10. The system of claim 1, comprising a welding power unit having the welding wire feeder.

11. The system of claim 1, comprising:
a first welding system, comprising:
a welding wire hub;
the first wire spool coupled to the welding wire hub; and
a welding power unit coupled to the welding wire feeder.

12. The system of claim 11, comprising:
a second welding system, comprising:
another wire feeder having another welding wire hub, the other welding wire hub having another wire-specific interface configured to enable mounting with the second wire spool and prevent mounting with the first wire spool, wherein the wire-specific interface and the other wire-specific interface are members of the same family of wire-specific interfaces;
the second wire spool coupled to the other welding wire hub; and
another welding power unit coupled to the other wire feeder.

13. A system, comprising:
a welding wire spool comprising a wire-specific interface configured to mount on a non-circular hub having a complementary interface and not mount on another hub without another complementary interface, wherein the non-circular hub has a generally triangular, quadrilateral, hexagonal, heptagonal, octagonal, nonagonal, decagonal, hendecagonal, dodecagonal, or tridecagonal shape.

14. The system of claim 13, wherein the wire-specific interface comprises a pin-receptacle through an outer face of the welding wire spool.

15. The system of claim 13, wherein the wire-specific interface comprises a non-cylindrical portion of a hub receptacle.

16. The system of claim 13, comprising a second welding wire spool comprising a second wire-specific interface configured to not mount on the non-circular hub having the complementary interface for the first welding wire spool.

17. A method for mounting a welding wire spool, comprising:
   receiving a welding wire spool having a non-circular interface with a complementary interface, wherein the interface is indicative of a type of wire, wherein the non-circular interface and the complementary interface have a generally triangular, quadrilateral, hexagonal, heptagonal, octagonal, nonagonal, decagonal, hendecagonal, dodecagonal, or tridecagonal shape; and
   obstructing a welding wire spool not having the interface.

18. The method of claim 17, wherein the complementary interface comprises a hub.

19. The method of claim 17, wherein obstructing a welding wire spool not having the interface comprises obstructing a different welding wire spool of a common family as the welding wire spool.

20. The method of claim 17, wherein receiving a welding wire spool comprises coupling a wire-specific male interface to a wire-specific female interface.

21. The method of claim 17, comprising dispensing a welding wire from the wire spool and welding a workpiece.

* * * * *